United States Patent
Clemens et al.

(10) Patent No.: US 7,534,034 B2
(45) Date of Patent: May 19, 2009

(54) DEVICE FOR DETECTING AT LEAST ONE ENVIRONMENTAL INFLUENCE

(75) Inventors: Wolfgang Clemens, Puschendorf (DE); Herbert Schewe, Herzogenaurach (DE)

(73) Assignee: PolyIC GmbH & Co. KG, Furth (DE)

( * ) Notice: Subject to any disclaimer, the term of this patent is extended or adjusted under 35 U.S.C. 154(b) by 0 days.

(21) Appl. No.: 10/433,961

(22) PCT Filed: Nov. 21, 2001

(86) PCT No.: PCT/DE01/04370

§ 371 (c)(1),
(2), (4) Date: Nov. 17, 2003

(87) PCT Pub. No.: WO02/46703

PCT Pub. Date: Jun. 13, 2002

(65) Prior Publication Data

US 2004/0062294 A1    Apr. 1, 2004

(30) Foreign Application Priority Data

Dec. 8, 2000    (DE) ................. 100 61 299

(51) Int. Cl.
*G01K 7/00* (2006.01)
*H01L 51/00* (2006.01)
*H01L 31/00* (2006.01)

(52) U.S. Cl. .................. 374/178; 374/208; 257/40; 257/470

(58) Field of Classification Search .............. 257/414, 257/40, 470; 374/178, 208
See application file for complete search history.

(56) References Cited

U.S. PATENT DOCUMENTS

| | | | |
|---|---|---|---|
| 3,512,052 A | 5/1970 | MacIver et al. | |
| 3,769,096 A | 10/1973 | Ashkin et al. | |
| 3,955,098 A | 5/1976 | Kawamoto | |
| 3,999,122 A | * 12/1976 | Winstel et al. | 324/71.1 |
| 4,183,006 A | * 1/1980 | Murakami et al. | 338/23 |
| 4,302,648 A | 11/1981 | Sado et al. | |
| 4,340,657 A | 7/1982 | Rowe | |
| 4,442,019 A | 4/1984 | Marks | |
| 4,865,197 A | 9/1989 | Craig | |
| 4,926,052 A | 5/1990 | Hatayama | |

(Continued)

FOREIGN PATENT DOCUMENTS

DE    42 43 832    6/1994

(Continued)

OTHER PUBLICATIONS

Koezuka, H. et al., "Macromolecular Electronic Device", Mol. Cryst. Liq. Cryst. 1994, vol. 2555, pp. 221-230.

(Continued)

*Primary Examiner*—Gail Verbitsky
*Assistant Examiner*—Mirellys Jagan
(74) *Attorney, Agent, or Firm*—Carella, Byrne et al.; Elliot M. Olstein; William Squire

(57) ABSTRACT

A device for detecting and/or transmitting at least one environmental influence, and a method for producing the same. The device comprises at least one receiver element and an evaluation circuit that is substantially composed of organic functional material.

10 Claims, 5 Drawing Sheets

U.S. PATENT DOCUMENTS

| | | | |
|---|---|---|---|
| 4,937,119 A | | 6/1990 | Nickles et al. |
| 4,951,028 A | * | 8/1990 | Tuller ........................ 338/22 R |
| 5,140,302 A | * | 8/1992 | Hara et al. ................... 340/449 |
| 5,173,835 A | | 12/1992 | Cornett et al. |
| 5,206,525 A | | 4/1993 | Yamamoto et al. |
| 5,259,926 A | | 11/1993 | Kuwabara et al. |
| 5,321,240 A | | 6/1994 | Takahira |
| 5,347,144 A | | 9/1994 | Garnier et al. |
| 5,350,237 A | * | 9/1994 | Hida .......................... 374/183 |
| 5,364,735 A | | 11/1994 | Akamatsu et al. |
| 5,395,504 A | | 3/1995 | Saurer et al. |
| 5,444,637 A | * | 8/1995 | Smesny et al. ............... 702/127 |
| 5,480,839 A | | 1/1996 | Ezawa et al. |
| 5,486,851 A | | 1/1996 | Gehner et al. |
| 5,502,396 A | | 3/1996 | Desarzens et al. |
| 5,546,889 A | | 8/1996 | Wakita et al. |
| 5,569,879 A | | 10/1996 | Gloton et al. |
| 5,574,291 A | * | 11/1996 | Dodabalapur et al. .......... 257/40 |
| 5,578,513 A | | 11/1996 | Maegawa |
| 5,580,794 A | | 12/1996 | Allen |
| 5,625,199 A | * | 4/1997 | Baumbach et al. ............. 257/40 |
| 5,629,530 A | * | 5/1997 | Brown et al. .................. 257/40 |
| 5,630,986 A | | 5/1997 | Charlton et al. |
| 5,652,645 A | | 7/1997 | Jain |
| 5,691,089 A | | 11/1997 | Smayling |
| 5,705,826 A | | 1/1998 | Aratani et al. |
| 5,729,428 A | | 3/1998 | Sakata et al. |
| 5,731,661 A | * | 3/1998 | So et al. ...................... 313/504 |
| 5,854,139 A | | 12/1998 | Aratani et al. |
| 5,869,972 A | | 2/1999 | Birch et al. |
| 5,883,397 A | | 3/1999 | Isoda et al. |
| 5,892,244 A | * | 4/1999 | Tanaka et al. .................. 257/40 |
| 5,967,048 A | | 10/1999 | Fromson et al. |
| 5,970,318 A | | 10/1999 | Choi et al. |
| 5,973,598 A | | 10/1999 | Beigel |
| 5,994,773 A | | 11/1999 | Hirakawa |
| 5,997,817 A | | 12/1999 | Crismore et al. |
| 5,998,805 A | | 12/1999 | Shi et al. |
| 6,036,919 A | | 3/2000 | Thym et al. |
| 6,045,977 A | | 4/2000 | Chandross et al. |
| 6,072,716 A | | 6/2000 | Jacobson et al. |
| 6,083,104 A | | 7/2000 | Choi |
| 6,087,196 A | | 7/2000 | Sturm et al. |
| 6,133,835 A | | 10/2000 | De Leeuw et al. |
| 6,143,206 A | * | 11/2000 | Handa et al. ................. 252/500 |
| 6,150,668 A | | 11/2000 | Bao et al. |
| 6,197,663 B1 | | 3/2001 | Chandross et al. |
| 6,207,472 B1 | | 3/2001 | Calligari et al. |
| 6,215,130 B1 | | 4/2001 | Dodabalapur |
| 6,221,553 B1 | | 4/2001 | Wolk et al. |
| 6,251,513 B1 | | 6/2001 | Rector et al. |
| 6,252,245 B1 | * | 6/2001 | Katz et al. .................... 257/40 |
| 6,278,127 B1 | * | 8/2001 | Dodabalapur et al. .......... 257/40 |
| 6,284,562 B1 | | 9/2001 | Batlogg et al. |
| 6,300,141 B1 | | 10/2001 | Segal et al. |
| 6,303,943 B1 | * | 10/2001 | Yu et al. ....................... 257/40 |
| 6,321,571 B1 | | 11/2001 | Themont et al. |
| 6,322,736 B1 | | 11/2001 | Bao et al. |
| 6,329,226 B1 | | 12/2001 | Jones et al. |
| 6,330,464 B1 | | 12/2001 | Colvin et al. |
| 6,335,539 B1 | | 1/2002 | Dimitrakopoulos et al. |
| 6,340,822 B1 | | 1/2002 | Brown et al. |
| 6,344,662 B1 | | 2/2002 | Dimitrakopoulos et al. |
| 6,362,509 B1 | | 3/2002 | Hart |
| 6,384,804 B1 | | 5/2002 | Dodabalapur et al. |
| 6,403,396 B1 | | 6/2002 | Gudesen et al. |
| 6,429,450 B1 | * | 8/2002 | Mutsaers et al. .............. 257/40 |
| 6,498,114 B1 | | 12/2002 | Amundson et al. |
| 6,517,995 B1 | | 2/2003 | Jacobsen et al. |
| 6,518,949 B2 | * | 2/2003 | Drzaic ......................... 345/107 |
| 6,521,109 B1 | * | 2/2003 | Bartic et al. ............ 204/403.01 |
| 6,555,840 B1 | | 4/2003 | Hudson et al. |
| 6,576,972 B1 | * | 6/2003 | Parsons ....................... 257/470 |
| 6,593,690 B1 | | 7/2003 | McCormick et al. |
| 6,603,139 B1 | | 8/2003 | Tessler et al. |
| 6,621,098 B1 | | 9/2003 | Jackson et al. |
| 6,852,583 B2 | | 2/2005 | Bernds et al. |
| 7,352,045 B2 | * | 4/2008 | Parsons et al. ............... 257/470 |
| 2002/0018911 A1 | | 2/2002 | Bernius et al. |
| 2002/0022284 A1 | | 2/2002 | Heeger et al. |
| 2002/0025391 A1 | | 2/2002 | Angelopoulos et al. |
| 2002/0053320 A1 | | 5/2002 | Duthaler |
| 2002/0056839 A1 | | 5/2002 | Joo et al. |
| 2002/0068392 A1 | | 6/2002 | Lee et al. |
| 2002/0130042 A1 | | 9/2002 | Moerman et al. |
| 2002/0170897 A1 | | 11/2002 | Hall |
| 2002/0195644 A1 | | 12/2002 | Dodabalapur et al. |
| 2003/0059987 A1 | | 3/2003 | Sirringhaus et al. |
| 2003/0112576 A1 | | 6/2003 | Brewer et al. |
| 2003/0175427 A1 | | 9/2003 | Loo et al. |
| 2004/0002176 A1 | | 1/2004 | Xu |
| 2004/0013982 A1 | | 1/2004 | Jacobson et al. |
| 2004/0026689 A1 | | 2/2004 | Bernds et al. |
| 2004/0084670 A1 | | 5/2004 | Tripsas et al. |
| 2004/0211329 A1 | | 10/2004 | Funahata et al. |

FOREIGN PATENT DOCUMENTS

| | | |
|---|---|---|
| DE | 101 17 663 | 10/2002 |
| EP | 0 108650 | 5/1984 |
| EP | 0 268 370 A2 | 5/1988 |
| EP | 0 268 370 A3 | 5/1988 |
| EP | 0 350 179 | 1/1990 |
| EP | 0 418504 | 3/1991 |
| EP | 0 442123 | 8/1991 |
| EP | 0460242 | 12/1991 |
| EP | 0501456 A2 | 9/1992 |
| EP | 0 511 807 | 11/1992 |
| EP | 0 511807 | 11/1992 |
| EP | 0 528662 | 2/1993 |
| EP | 0 685 985 | 12/1995 |
| EP | 0 685985 | 12/1995 |
| EP | 0716458 | 6/1996 |
| EP | 0 785 578 A2 | 7/1997 |
| EP | 0 785 578 A3 | 7/1997 |
| EP | 0 786820 | 7/1997 |
| EP | 0 615 256 B1 | 9/1998 |
| EP | 0962984 | 12/1999 |
| EP | 0966182 | 12/1999 |
| EP | 0 979 715 | 2/2000 |
| EP | 0981165 | 2/2000 |
| EP | 0989614 A2 | 3/2000 |
| EP | 1 048 912 | 11/2000 |
| EP | 1065725 A2 | 1/2001 |
| EP | 1 083 775 A1 | 3/2001 |
| EP | 1 102 335 A2 | 5/2001 |
| EP | 1 104 035 A2 | 5/2001 |
| EP | 1224999 | 7/2002 |
| EP | 1237207 | 9/2002 |
| EP | 1 318 084 | 6/2003 |
| GB | 723598 | 2/1955 |
| GB | 2 058 462 | 4/1981 |
| JP | 54069392 | 6/1979 |
| JP | 57012332 A * | 1/1982 |
| JP | 60117769 | 6/1985 |
| JP | 61001060 | 1/1986 |
| JP | 361001060 | 5/1986 |
| JP | 61167854 | 7/1986 |
| JP | 362065477 A | 3/1987 |
| JP | 01169942 | 7/1989 |
| JP | 01669942 | 7/1989 |
| JP | 03120433 A * | 5/1991 |
| JP | 05152560 | 6/1993 |
| JP | 05259434 | 10/1993 |

| | | |
|---|---|---|
| JP | 05347422 | 12/1993 |
| JP | 06174674 A * | 6/1994 |
| JP | 08197788 | 8/1996 |
| JP | 09083040 | 3/1997 |
| JP | 09320760 | 12/1997 |
| JP | 10026934 | 1/1998 |
| JP | 2969184 B | 11/1999 |
| JP | 2001085272 | 3/2001 |
| WO | WO 93 16491 | 8/1993 |
| WO | WO 94/17556 | 8/1994 |
| WO | WO 95/06240 | 3/1995 |
| WO | WO 95 31831 | 11/1995 |
| WO | WO 96 02924 | 2/1996 |
| WO | WO 96/19792 | 6/1996 |
| WO | WO 97/12349 | 4/1997 |
| WO | WO 97/18944 | 5/1997 |
| WO | WO 98 18186 | 4/1998 |
| WO | WO 9818156 | 4/1998 |
| WO | WO 98/40930 | 9/1998 |
| WO | WO 99/07189 | 2/1999 |
| WO | WO 99/10929 | 3/1999 |
| WO | WO 99 10939 | 3/1999 |
| WO | WO 99 21233 | 4/1999 |
| WO | WO 99 30432 | 6/1999 |
| WO | WO 99 39373 | 8/1999 |
| WO | WO 99 40631 | 8/1999 |
| WO | WO 99/53371 | 10/1999 |
| WO | WO 99 54936 | 10/1999 |
| WO | WO 99/66540 | 12/1999 |
| WO | WO 00/33063 | 6/2000 |
| WO | WO 00/36666 | 6/2000 |
| WO | WO0034764 A1 * | 6/2000 |
| WO | WO 00 79617 | 12/2000 |
| WO | WO 01/03126 | 1/2001 |
| WO | WO 01/06442 | 1/2001 |
| WO | WO0108241 | 2/2001 |
| WO | WO 01 15233 | 3/2001 |
| WO | WO 01/15233 | 3/2001 |
| WO | WO 01/17029 | 3/2001 |
| WO | WO 01 17041 | 3/2001 |
| WO | WO 01/27998 | 4/2001 |
| WO | WO 01/46987 | 6/2001 |
| WO | WO 01 47045 | 6/2001 |
| WO | WO 0147044 A2 | 6/2001 |
| WO | WO0173109 A2 | 10/2001 |
| WO | WO 02/05360 | 1/2002 |
| WO | WO0205361 | 1/2002 |
| WO | WO 02/15264 | 2/2002 |
| WO | WO 02 19443 | 3/2002 |
| WO | WO 02/29912 | 4/2002 |
| WO | WO 02/43071 | 5/2002 |
| WO | WO 02/47183 | 6/2002 |
| WO | WO 02/065557 | 8/2002 |
| WO | WO 02/071139 | 9/2002 |
| WO | WO 02/071505 | 9/2002 |
| WO | WO 02/076924 | 10/2002 |
| WO | WO 02/091495 | 11/2002 |
| WO | WO 02095805 A2 | 11/2002 |
| WO | WO 02/099908 | 12/2002 |
| WO | WO02099907 | 12/2002 |
| WO | WO 03/046922 | 6/2003 |
| WO | WO 03/069552 | 8/2003 |
| WO | WO 03067680 | 8/2003 |
| WO | WO 03/081671 | 10/2003 |
| WO | WO 03/095175 | 11/2003 |
| WO | WO 2004/032257 | 4/2004 |
| WO | WO2004042837 | 5/2004 |
| WO | WO2004047144 A2 | 6/2004 |
| WO | WO2004047194 A2 | 6/2004 |
| WO | WO 2004/083859 | 9/2004 |

OTHER PUBLICATIONS

Brabec, C.J. et al, "Photoinduced FT-IR spectroscopy and CW-photocurrent measurements of conjugated polymers and fullerenes blended into a conventional polymer matrix", Solar Energy Materials and Solar Cells, 2000 Elsevier Science V.V., pp. 19-33.
Brabec, C.J. et al., "Photovoltaic properties of a conjugated polymer/methanofullerene composites embedded in a polystyrene matrix", Journal of Applied Physics, vol. 85, No. 9, 1999, pp. 6866-6872.
Gosain, D.P., "Excimer laser crystallized poly-Si TFT's on plastic substrates", Second International Symposium on Laser Precision Microfabrication, May 16-18, 2001, Singapore, vol. 4426, pp. 394-400.
Lu, Wen et al., "Use of Ionic Liquids for π-Conjugated Polymer Electrochemical Devices", Science, vol. 297, 2002, pp. 983-987/.
Shaheen, S.E., et al., "Low band-gap polymeric photovoltaic devices", Synthetic Metals, vol. 121, 2001, pp. 1583-1584.
Takashima, W. et al., "Electroplasticity Memory Devices Using Conducting Polymers and Solid Polymer Electrolytes", Polymer International, Melbourne, 1992, pp. 249-253.
Velu, G. et al. "Low Driving Voltages and Memory Effect in Organic Thin-Film Transistors With A Ferroelectric Gate Insulator", Applied Physics Letters, American Institute of Physics, New York, Vo.I 79, No. 5, 2001, pp. 659-661.
Wang, Hsing et al., "Conducting Polymer Blends: Polythiophene and Polypyrrole Blends with Polystyrene and Poly(bisphenol A carbonate)", Macromolecules, 1990, vol. 23, pp. 1053-1059.
Wang, Yading et al., "Electrically Conductive Semiinterpenetrating Polymer Networks of Poly(3-octylthiophene)", Macromolecules 1992, vol. 25, pp. 3284-3290.
U.S. Appl. No. 10/535,448, W. Clemens et al.
U.S. Appl. No. 10/535,449, Walter Fix et al.
U.S. Appl. No. 10/344,926, filed Feb. 12, 2004, Adolf Bernds et al.
U.S. Appl. No. 10/344,951, Adolf Bernds et al.
U.S. Appl. No. 10/362,932, filed Oct. 2, 2003, Adolf Bernds et al.
U.S. Appl. No. 10/380,113, filed Sep. 25, 2003, Adolf Bernds et al.
U.S. Appl. No. 10/380,206, Adolf Bernds et al.
U.S. Appl. No. 10/381,032, Adolf Bernds et al.
U.S. Appl. No. 10/433,959, Adolf Bernds.
U.S. Appl. No. 10/451,108, Mark Giles et al.
U.S. Appl. No. 10/467,636, Adolf Bernds et al.
U.S. Appl. No. 10/473,050, Adolf Bernds et al.
U.S. Appl. No. 10/479,234, filed Dec. 30, 2004, Adolf Bernds et al.
U.S. Appl. No. 10/479,238, Adolf Bernds et al.
U.S. Appl. No. 10/492,922, Erwann Buillet et al.
U.S. Appl. No. 10/492,923, filed Dec. 23, 2004, Wolfgang Clemens et al.
U.S. Appl. No. 10/498,610, Walter Fix et al.
U.S. Appl. No. 10/508,737, Adolf Bernds et al.
U.S. Appl. No. 10/517,750, Wolfgang Clemens et al.
Harsanyi G. et al., "Polytronics for biogtronics:unique possibilities of polymers In biosensors and BioMEMS", IEEE Polytronic 2002 Conference, Jun. 23, 2002, pp. 211-215.
Schrodner M. et al., "Plastic electronics based on Semiconducting Polymers", First International IEEE Conference on Polymers and Adhesives in Microelectronics and Photonics. Incorporating Poly, Pep & Adhesives in Electronics. Proceedings (Cat. No. 01TH8592), First International IEEE Conference on Polymers and Adhesives in Micr. Seitenn 91-94.
Oelkrug, D. et al., "Electronic spectra of self-organized oligothiophene films with 'standing' and 'lying' molecular units", Elsevier Science S.A., 1996, Thin Solid Films 284-270.
Sandberg, H. et al, "Ultra-thin Organic Films for Field Effect Transistors", SPIE vol. 4466, 2001, pp. 35-43.
Chen, X.L. et al., "Morphological and Transistor Studies of Organic Molecular Semiconductors with Anisotropic Electrical Characteristics", American Chemical Society, 2001, Chem. Mater. 2001, 13, 1341-1348.
De Leeuw D.M. et al., "Polymeric integrated circuits and light-emitting diodes", Electron Devices Meeting, 1997. Technical Digest, International, Washington, DC, USA Dec. 7-10, 1997, New York, NY, USA, IEEE, US Dec. 7, 1997.

Lowe, J. et al., "Poly (3—(2—Acetoxyethyl)Thiophene): A Model Polymer for Acid Catalyzed Lithography", Synthetic Metals, Elsevier Sequoia, Lausanne, CH, Bd. 85, 1997, Seiten 1427-1430.

Garnier F et al:, "Vertical Devices Architecture By Molding Of Organic-Based Thin Film Transistor", Applied Physics Letters, American Institute Of Physics. XP000784120, issn: 0003-6951 abbildung 2.

Collet J. et al:, Low Voltage, 30 NM Channel Length, Organic Transistors With a Self-Assembled Monolayer as Gate Insulating Films:, Applied Physics Letters, American Institute of Physics. New York, US, Bd 76, Nr. 14, Apr. 3, 2000, Seiten 1941-1953, XP000950589, ISSN:0003-6951, das ganze Dokument.

Hwang J D et al:, "A Vertical Submicron Slc thin film transistor", Solid State Electronics, Elsevier Science Publishers, Barking, GB, Bd. 38, Nr. 2, Feb. 1, 1995, Seiten 275-278, XP004014040, ISSN:0038-1101, Abbildung 2.

Rogers J A et al:, "Low-Voltage 0.1 Mum Organic Transistors and Complementary Inverter Circuits Fabricated with a Low-Cost Form of Near-Field Photolithography", Applied Physics Letters, American Institute of Physics. New York, US, Bd. 75, Nr. 7, Aug. 16, 1999, Seiten 1010-1012, XP000934355, ISSN: 003-6951, das ganze Dokument.

"Short-Channel Field-Effect Transistor", IBM Technical Disclosure Bulletin, IBM Corp., New York, US, Bd. 32. Nr. 3A, Aug. 1, 1989, Seiten 77-78, XP000049357, ISSN:0018-8689, das ganze Dokument.

Redecker, M. et al., "Mobility enhancement through homogeneous nematic alignment of a liquid-crystalline polyfluorene", 1999 American Institute of Physics, Applied Physics Letters, vol. 74, No. 10, pp. 1400-1402.

Rogders, J. A. et al:, "Printing Process Suitable for Reel-to-Reel Production of High-Performance Organic Transistors and Circuits", Advanced Materials, VCH, Verlagsgesellschaft, Weinheim, DE, Bd. 11, Nr. 9, Jul. 5, 1999, Seiten 741-745, P000851834, ISSN: 0935-9648, das ganze Dokument.

Miyamoto, Shoichi et al:, Effect of LDD Structure and Channel Poly-Si Thinning on a Gate-All-Around TFT (GAT) for SRAM's, IEEE Transactions on Electron Devices. vol. 46, No. 8, Aug. 1999.

Kumar, Anish et al:, "Kink-Free Polycrystalline Silicon Double-Gate Elevated-Channel Thin-Film Transistors", IEEE Transactions on Electron Devices, vol. 45, No. 12, Dec. 1998.

Chen, Shiao-Shien et al:, "Deep Submicrometer Double-Gate Fully-Depleted SOI PMOS Devices: A Concise Short-Channel Effect Threshold Voltage Model Using a Quasi-2D Approach", IEEE Transaction on Electron Devices, vol. 43, No. 9, Sep. 1996.

Forrest et al.: "The Dawn of Organic Electronics", IEEE Spectrum, Aug. 2000, Seiten 29-34, XP002189000, IEEE Inc., New York, US ISSN0018-9235, Seite 33, rechte Spalte, Zelle 58-Seite 34, linke Spalte, Zeile 24: Abbildung 5.

Zie Voor Titel Boek, de 2e Pagnia, XP-002189001, p. 196-228.

Drury et al., "Low-Cost All-Polymer Integrated Circuits", American Institute of Physics, Applied Physics Letters, 1998, vol. 73, No. 1, pp. 108-110, Jul. 6, 1998.

Garnier, F. et al, "All-Polymer Field-Effect Transistor Realized by Printing Techniques", Science, American Association for the Advancement of Science, US, vol. 265, Sep. 16, 1994, pp. 1684-1686.

Assadi A, et al:, Field-Effect Mobility of Poly (3-Hexylthiophene) Dept. of Physics and Measurement Technology, Received Mar. 3, 1988: accepted for Publication May 17, 1988.

Bao, Z. et al., "High-Performance Plastic Transistors Fabricated by Printing Techniques", Chem. Mater vol. 9, No. 6, 1997, pp. 1299-1301.

Drury, C. J. et al., "Low-cost all-polymer Integrated circuits", Applied Physics Letters, vol. 73, No. 1, Jul. 6, 1988, pp. 108-110.

Angelopoulos M et al, "In-Situ Radiation Induced Doping", Mol. Cryst. Liq. Cryst. 1990, vol. 189, pp. 221-225.

Dai, L. et al, Photochemical Generation of Conducting Pattersn in Polybutadiene Films:, Macromolecules, vol. 29, No. 1, 1996, pp. 282-287, XP 001042019, the whole document.

Roman et al., Polymer Diodes With High Rectification:, Applied Physics Letters, vol. 75, No. 21, Nov. 22, 1999.

Schoebel, "Frequency Conversion with Organic-On-Inorganic Heterostructured Diodes", Extended Abstracts of the International Conference on Solid State Devices and Materials, Sep. 1, 1997.

Braun D., et al., "Visible light emission from semiconducting polymer diodes", American Institute of Physics, Applied Physics Letters 58, May 6, 1991, pp. 1982-1984.

Yu, G. et al., "Dual-function semiconducting polymer devices: Light-emitting and photodetecting diodes", American Institute of Physics, Applied Physics Letter 64, Mar. 21, 1994, pp. 1540-1542.

Lucent Technologies. "Innovation marks significant milestone in the development of electronic paper", Cambridge, MA and Murray Hill, NJ, Nov. 20, 2000. XP-00209726.

Hebner, T.R. et al., Ink-jet printing of doped polymers for organic light emitting devices:, American Institute of Physics, Applied Physics Letters, vol. 72, No. 5, Feb. 2, 1998, pp. 519-521.

Garnier et al., "Conjugated Polymers and Oligomers as Active Material For Electronic Devices", Synthetic Metals, vol. 28, 1989.

Gelinck, G.H. et al., "High-Performance All-Polymer Integrated Circuits", Applied Physics Letters, v. 77, 2000, pp. 1487-1489.

Zheng, Xiang-Yang et al., "Electrochemical Patterning of the Surface of Insulators with Electrically Conductive Polymers", J. Electrochem. Soc., v. 142, 1995, pp. L226-L227.

Lidzey, D. G. et al., "Photoprocessed and Micropatterned Conjugated Polymer LEDs", Synthetic Metals, V. 82, 1996, pp. 141-148.

Kobel W. et al., "Generation of Micropatterns in Poly (3-Methyl-Thiophene) Films Using Microlithography: A First Step in the Design of an All-Organic Thin-Film Transistor" Synthetic Metals, V. 22, 1988, pp.265-271.

Rost, Henning et al., "All-Polymer Organic Field Effect Transistors", Proc. Mat. Week, CD, 2001, pp. 1-6.

Manuelli, Alessandro et al., "Applicability of Coating Techniques for the Production of Organic Field Effect Transistors", IEEE Polytronic 2002 Conference, 2002, pp. 201-204.

Ullman, A. et al., "High Performance Organic Field-Effect Transistors and Integrated Inverters", Mat. Res. Soc. Symp. Proc., v. 665, 2001, pp. 265-270.

Fix, W. et al., "Fast Polymer Integrated Circuits Based on a Polyfluorene Derivative", ESSDERC 2002, 2002, pp. 527-529.

Knobloch, A. et al., "Printed Polymer Transistors", Proc. Polytronic, v. 84, 2001, pp. 84-89.

Ficker, J. et al., "Dynamic and Lifetime Measurements of Polymer OFETS and Integrated Plastic Circuits," Proc. of SPIE, v. 466, 2001, pp. 95-102.

Crone, B. et al, "Large-scale complementary Integrated circuits based on Organic transistors", Nature, vol. 403, Feb. 3, 2000, pp. 521.

Fix, W., et al., "Fast polymer integrated circuits", American Institute of Physics, Applied Physics Letters, vol. 81, No. 89, Aug. 2002, pp. 1735-1737.

Dodabalapur, A. et al., "Organic smart pixels", American Institute of Physics, Applied Physics Letters, vol. 73, No. 2, Jul. 13, 1998, pp. 142-144.

Halls, J.J. M., et al., "Efficient photodiodes from interpenetrating polymer networks", Nature, vol. 376, Aug. 10, 1995, pp. 498-500.

Brown, A.R. et al., "Field-effect transistors made from solution-processed organic semiconductors", Elsevier Science, S.A., Synthetic Metals 88 (1997) pp. 37-55.

Brown, A.R., "Logic Gates Made from Polymer Transistors and Their Use in Ring Oscillators", Science, vol. 270, Nov. 10, 1995, pp. 972-974.

Klauk, H. et al., "Pentacene Thin Film Transistors and Inverter Circuits", 1997 International Exectron Devices Meeting Technical Digest, pp. 539-542, Dec. 1997.

Klauk, H. et al., "Fast Organic Thin Film Transistor Circuits", IEEE Electron Device Letters, vol. 20, No. 6, pp. 289-291, Jun. 1999.

Bao, Z. et al., "Organic and Polymeric Materials for the Fabrications of Thin Film Field-Effect Transistors", paper presented at the meeting of American Chemical Society, Division of Polymer Chemistry, XX, XX, Bd. 39, Nr. 1, Mar. 29, 1998, P001032497, ISSN: 0032-3934 das ganze Dokument.

Dai, L. et al., "Conjugation of Polydienes by Oxidants Other Than Iodine", Elsevier Science S.A., Synthetic Metals 86 (1997) 1893-1894.

Dai, L. et al., "$I_2$-Doping" of 1,4-Polydienes, Elsevier Science S.A., Synthetic Metals 69 (1995), pp. 563-566.
Kawase, T. et al., "Inkjet Printed Via-Hole Interconnections and Resistors for All-Polymer Transistor Circuits", Advanced Materials 2001, 13, No. 21, Nov. 2, 2001, pp. 1601-1605.
Quio, X. et al., "The FeCl3-doped poly-3alkithiophenes) in solid state", Elsevier Science, Synthetic Metals 122 (2001) pp. 449-454.
U.S. Appl. No. 10/541,815, Axel Gerit et al.
U.S. Appl. No. 10/541,956, Wolfgang Clemens et al.
U.S. Appl. No. 10/541,957, Walter Fix et al.
U.S. Appl. No. 10/543,561, Wolfgang Clemens et al.
U.S. Appl. No. 10/542,679, Adolf Bernds et al.
U.S. Appl. No. 10/344,951, filed Feb. 12, 2004, Adolf Bernds et al.
U.S. Appl. No. 10/381,032, filed Feb. 12, 2004, Adolf Bernds et al.
U.S. Appl. No. 10/433,959, filed Apr. 1, 2004, Adolf Bernds.
U.S. Appl. No. 10/433,961, filed Apr. 1, 2004, Wolfgang Clemens et al.
U.S. Appl. No. 10/451,108, filed May 13, 2004, Mark Giles et al.
U.S. Appl. No. 10/467,636, filed Nov. 4, 2004, Adolf Bernds et al.
U.S. Appl. No. 10/473,050, filed May 20, 2004, Adolf Bernds et al.
U.S. Appl. No. 10/479,238, filed Oct. 20, 2004, Adolf Bernds et al.
U.S. Appl. No. 10/492,922, filed Mar. 3, 2005, Erwann Buillet et al.
U.S. Appl. No. 10/498,610, filed Sep. 29, 2005, Walter Fix et al.
U.S. Appl. No. 10/508,640, filed Dec. 15, 2005, Walter Fix et al.
U.S. Appl. No. 10/508,737, filed May 19, 2005, Adolf Bernds et al.
U.S. Appl. No. 10/517,750, filed Oct. 13, 2005, Wolfgang Clemens et al.
U.S. Appl. No. 10/523,216, filed Feb. 2, 2006, Adolf Bernds et al.
U.S. Appl. No. 10/523,487, filed Apr. 13, 2006, Wolfgang Clemens et al.
U.S. Appl. No. 10/524,646, filed May 11, 2006, Walter Fix et al.
U.S. Appl. No. 10/533,756, Wolfgang Clemens et al.
U.S. Appl. No. 10/534,678, Wolfgang Clemens et al.
U.S. Appl. No. 10/535,449, filed Feb. 16, 2006, Walter Fix et al.
U.S. Appl. No. 10/541,815, Axel Gerlt et al.
U.S. Appl. No. 10/542,678, Adolf Bernds et al.
U.S. Appl. No. 10/542,679, filed Mar. 16, 2006, Adolf Bernds et al.
U.S. Appl. No. 10/562,989, Jurgen Ficker et al.
U.S. Appl. No. 10/562,869, Wolfram Glauert.
U.S. Appl. No. 10/569,763, Walter Fix et al.
U.S. Appl. No. 10/568,730, Wolfgag Clemens et al.
U.S. Appl. No. 10/569,233, Adolf Bernds et al.
U.S. Appl. No. 10/570,571, Clemens et al.
U.S. Appl. No. 10/562,989, filed Jun. 29, 2006, Jurgen Ficker et al.
U.S. Appl. No. 10/562,869, filed Oct. 5, 2006, Walter Fix et al.
U.S. Appl. No. 10/568,730, filed Feb. 8, 2007, Wolfgang Clemens et al.
U.S. Appl. No. 10/569,233, filed Jan. 25, 2007, Adolf Bernds et al.
U.S. Appl. No. 10/570,571, filed Jan. 11, 2007, Wolfgang Clemens et al.
U.S. Appl. No. 10/585,775, Walter Fix.
U.S. Appl. No. 11/574,139, Jurgen Ficker.

* cited by examiner

DEVICE FOR DETECTING AT LEAST ONE ENVIRONMENTAL INFLUENCE

CROSS REFERENCE TO RELATED APPLICATIONS

This is the 35 USC 371 national stage of international application PCT/DE01/04370 filed on Nov. 21, 2001, which designated the United States of America.

FIELD OF THE INVENTION

The invention relates to a device for detecting and/or transmitting at least one environmental influence, to uses thereof and a method for producing the said device.

BACKGROUND OF THE INVENTION

A photodiode, a photoelectric barrier, a solar cell, a humidity, pressure and/or temperature sensor are examples of a device for detecting and/or transmitting at least one environmental influence, said device comprising at least one receiver element that records an environmental influence and an evaluation circuit that receives, evaluates, possibly amplifies and transmits a signal from the receiver element.

Devices of this type are known which are based on conventional inorganic semiconductor materials such as silicon and gallium arsenide. These devices, such as sensors for example, are produced in manufacturing processes of conventional semiconductor technology. The raw materials used as well as the process steps result in the devices being expensive and accordingly being used only very selectively.

However, since a comprehensive sensor technology has advantages for virtually all areas of industry, energy, transportation and life in general because it allows better recording of currently obtaining conditions and/or more efficient use of energy, there is a demand for cheaper devices of the aforementioned kind to be produced.

SUMMARY OF THE INVENTION

The object of the present invention is therefore to provide a device for detecting and/or transmitting at least one environmental influence which is comparable in performance with the conventional devices from the semiconductor industry and/or is cheaper in comparison with these.

There are essentially two approaches to achieve this object. On the one hand, at least one cheaper raw material can be used for the production process; on the other, the complex production method used in semiconductor technology, comprising coating, patterning, etching and etching back etc., can be simplified.

Both these starting points are taken into account in the object of the invention, which introduces the new organic semiconductor technology (integrated plastic circuits (IPC) and/or organic field effect transistors (OFET)) in this field.

The object of the invention is a device for detecting and/or transmitting at least one environmental influence, said device substantially being composed of organic material and comprising at least one receiver element which records at least one environmental influence and/or converts this environmental influence into an electrical signal and at least one evaluation circuit which processes and transmits a received signal. A further object of the invention is a method for producing a device for detecting and/or transmitting at least one environmental influence, in which method at least one receiver element, one evaluation circuit and/or an associated connection arrangement is constructed by coating at least one substrate with organic material. Finally, an object of the invention is to use a device for detecting and/or transmitting at least one environmental influence in industry, in monitoring/sensor technology and/or in transportation.

Any quantifiable impulse of the environment which can be converted into a current and/or a voltage is referred to here as an environmental influence. An example of this from nature is a solar ray, a change in atmospheric pressure or, in the industrial domain, an increase in the concentration of a certain gas and a change in temperature and/or humidity. All these influences can lead via suitably sensitive chemical compounds (which are present in the receiver element) to a situation in which a conducting material becomes non-conducting or substantially less conducting and/or in which voltage or current is generated in a material and/or that the electrical resistance in a material is changed. These effects are measurable and can be converted into defined signals via an evaluation circuit or stored in order to generate energy.

Also conceivable is a tactile and/or pressure sensor in which an electrical signal is generated by pressure, as in the case of a keyboard for example.

A particularly advantageous embodiment of the device for detecting and/or transmitting at least one environmental influence has the receiver element and an element of the evaluation circuit integrated on a substrate. This results in very compact devices which exhibit a large saving in volume compared with the conventional devices of the silicon-dominated semiconductor technology. While it is possible that the Si sensors are smaller than the new devices, more important as an alternative is first and foremost the ease of attachment e.g. to flexible substrates and/or to substrates (package, packing) which are already present in any case. This also opens up totally new uses for the devices because, thanks to their cheapness, the devices according to this embodiment can be used as single-use products and, thanks to their small volume, are suitable for use as e.g. labels etc. Also possible by this means is, for example, a form of pharmaceutical packaging which, by comprising a corresponding device, can provide information on how long the preparation has been stored and at what temperatures.

According to the embodiment of the device, it is a temperature, humidity and/or pressure sensor, a photoelectric barrier, an optical sensor, a solar cell and/or something similar.

According to an advantageous embodiment, the device can receive, process and forward (transmit) a plurality of environmental influences in parallel. Also, it is possible, for example, for the temperature, pressure and composition of a gas and/or liquid mixture to be detected, stored together with the duration and/or passed on to a closed-loop and control system. A particular threshold value for temperature, humidity, pressure and/or light intensity can be measured and represented. This process can be either reversible and record the current value or irreversible, for example to indicate whether a deep-frozen product has been briefly thawed out or whether a package/medicine was ever exposed to a high temperature or a high level of humidity. All previously known application areas for devices for detecting and/or transmitting at least one environmental influence can be realized by means of the new semiconductor technology which is primarily based on organic materials. At the same time the choice of sensitive chemical compounds which can be used in the receiver element is unlimited and can be geared specifically to the particular problem and/or developed for the particular task in question.

The term "organic material/functional material" as used here comprises all types of organic, organometallic and/or inorganic synthetic materials referred to as e.g. "plastics".

This includes all types of materials with the exception of the semiconductors which form the traditional diodes (germanium, silicon) and the typical metallic conductors (e.g. copper, aluminum) which are mainly used in the context of electrodes and/or contact pins. A restriction in the dogmatic sense to organic material as material containing carbon is accordingly not provided. To the contrary, consideration is also given to the widespread use of e.g. silicons. Moreover, the term is not to be subject to any restriction with regard to the molecule size, especially to polymer and/or oligomer materials, but instead the use of "small molecules" is also entirely possible.

The expression "substantially composed of organic material" serves to indicate that it is altogether possible for functional elements to be fashioned also from metal, silicon or some other material.

A particularly advantageous embodiment is one in which at least one organic functional material such as e.g. the organic conductor, the organic insulator and/or the organic semiconductor are identical in at least one receiver element and in at least one element of the evaluation circuit of the device. This embodiment is noteworthy by virtue of particularly advantageous production costs if an organic material is deposited on multiple points of the substrate in a single operation e.g. by printing or coating using the doctor blade technique.

In the event that the change in temperature is received as an environmental influence, the conductor track of the receiver element, for example, can be composed of organic material such as polyaniline and/or be an organic conductor which changes its resistance at or above a certain temperature in such a manner that it becomes an insulator or virtually an insulator. This may be a reversible or an irreversible process within the material. In any case the receiver element for this device is furnished with an organic conductor in which a change in temperature either causes voltage or current to be generated by charge separation or leads to an abrupt change in resistance. The receiver element is thus not only placed in a position to record and measure the environmental influence "temperature change", but also to pass on a signal to the evaluation circuit. Examples of such a material are PTC (positive temperature coefficient) thermally sensitive resistors which can be produced from doped polycrystalline ceramic material based on barium titanate.

In the event that the composition of a gas mixture such as e.g. atmospheric moisture is to be measured, an organic conducting material can be used in which, depending on the concentration of the material to be measured, e.g. water in air, a current is generated in the conductor track or there is a change in the resistance (for example through a change in solubility behavior, cf. PEDOT). Here, the change in resistance may be reversible or irreversible, depending on material.

In the event that the pressure is to be measured, organic piezoelectric plastics are known that generate a voltage when they are stretched or compressed.

For light sensors there are also examples where the organic functional materials of a diode are chosen such that they generate voltage under the action of light and/or their physical properties change reversibly or irreversibly.

According to an advantageous embodiment, the device amplifies recorded environmental influences or signals and transmits them in either linear (analog) or digital form.

According to an advantageous embodiment of the method, at least one layer of organic functional material is generated on the substrate by printing (e.g. pad printing, offset printing) or by application using the doctor blade technique, i.e. by structured deposition on a lower layer or the substrate or by introducing material into/filling in recesses. It is particularly advantageous here that structured layers can be generated simply by printing/application by doctor blade and do not have to be produced, as in traditional semiconductor technology, by means of photomasks and etching steps.

The preferred use of a device for detecting and/or transmitting at least one environmental influence is in industry, monitoring/sensor technology and/or transportation. In medical engineering such devices are of interest as single-use sensors.

For example, the device serves as a label or part of a label in order to make clear which environmental influences the labeled object was exposed to. It can also be usefully attached as an RFID tag, as a postage stamp, on transport packaging, in a pharmaceutical product, in a deep-frozen product, on moisture-sensitive parts, as part of a photocell, and in toys. Not least, the device can serve as a temperature sensor (conversely, it can also be a mini-heater which can be controlled by the electronics), as a pressure sensor (conversely, it can also be a mini-speaker), as a gas sensor, and/or as a safety element (warning of CO poisoning).

BRIEF DESCRIPTION OF THE DRAWINGS

The invention is explained in more detail in the following with reference to six figures which show various embodiments of the present invention wherein.

DETAILED DESCRIPTION OF THE INVENTION

Figure 1:
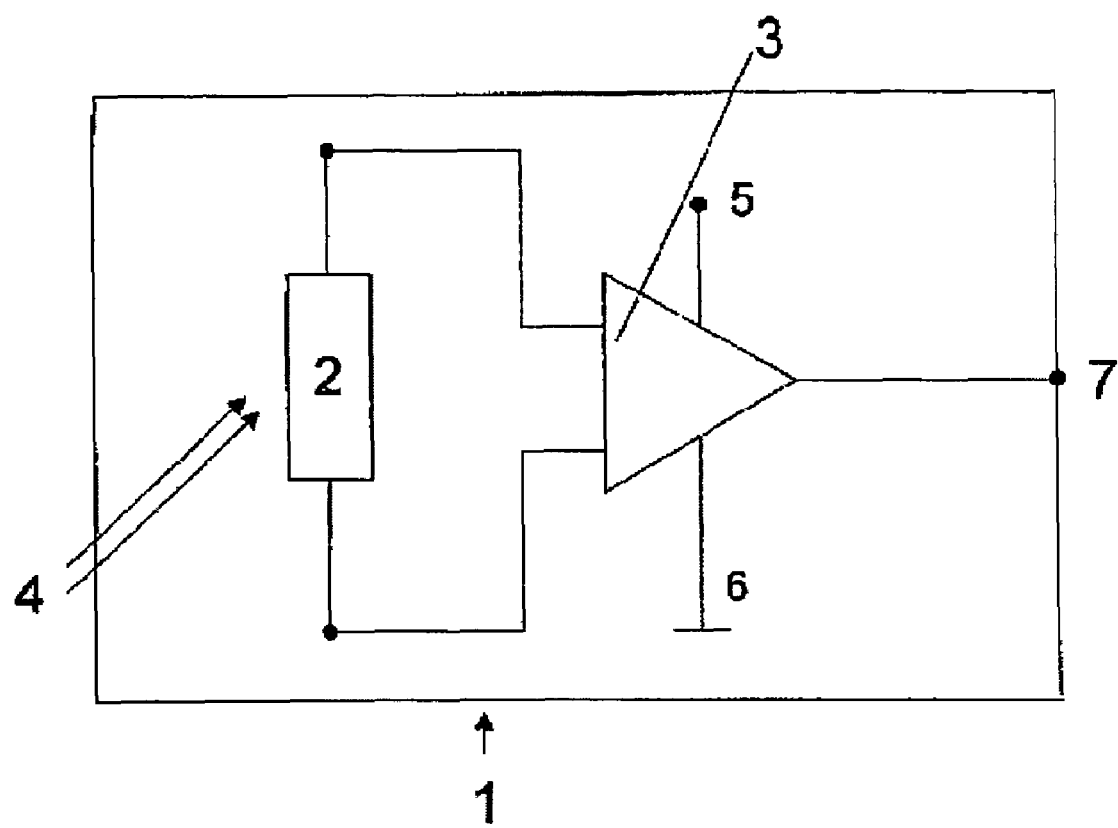
FIG. 1 is a block diagram of a device for detecting and/or transmitting at least one environmental influence.

FIG. 1 shows a block diagram of the device for detecting and/or transmitting at least one environmental influence 1. At least one environmental influence 4 causes a change in a resistance in the receiver element or sensor 2 and/or generates a voltage which either changes and/or initiates a current flow to an element 3 of the evaluation circuit. The element 3 of the evaluation circuit is connected to a supply voltage 5 and a ground 6. The evaluation circuit comprises evaluation electronics based on organic field-effect transistors, with the aid of which the received signal is transmitted by either digital or analog means to signal output 7.

Figure 2:
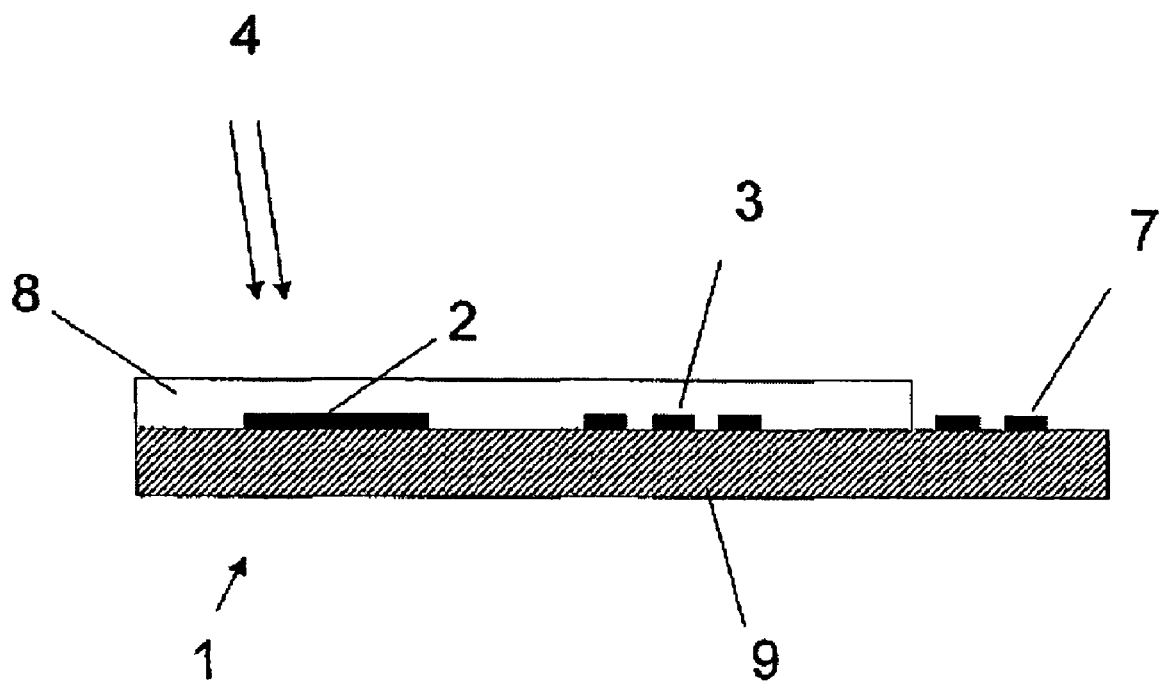
FIG. 2 is a sectional elevation view of a device for detecting and/or transmitting at least one environmental influence.

FIG. 2 shows a cross-section through a device for detecting and/or transmitting at least one environmental influence 1. On the extreme left on the substrate or carrier 9, which can therefore be e.g. flexible, in other words a film, can be seen the encapsulation 8, which can be applied differently according to environmental influence, in other words e.g. transparently or by chasing out the receiver element 2 (e.g. if the pressure or the gas composition is to be measured). Residing under the encapsulation 8 in the case shown is the receiver element 2, on which the environmental influence 4, e.g. light, heat and/or humidity (depending on the type of encapsulation) etc., acts through the encapsulation 8. Depending on which environmental influence is to be received, the encapsulation for this is permeable or exposed at the receiving point.

Also located under the encapsulation 8 is the element 3, which comprises the organic evaluation electronics. Outside of the encapsulation 8 are the output signal and/or the connecting contacts 7. Depending on sensor type, the actual sensor element may also be located outside of an encapsulation, e.g. humidity sensor.

Figure 3:
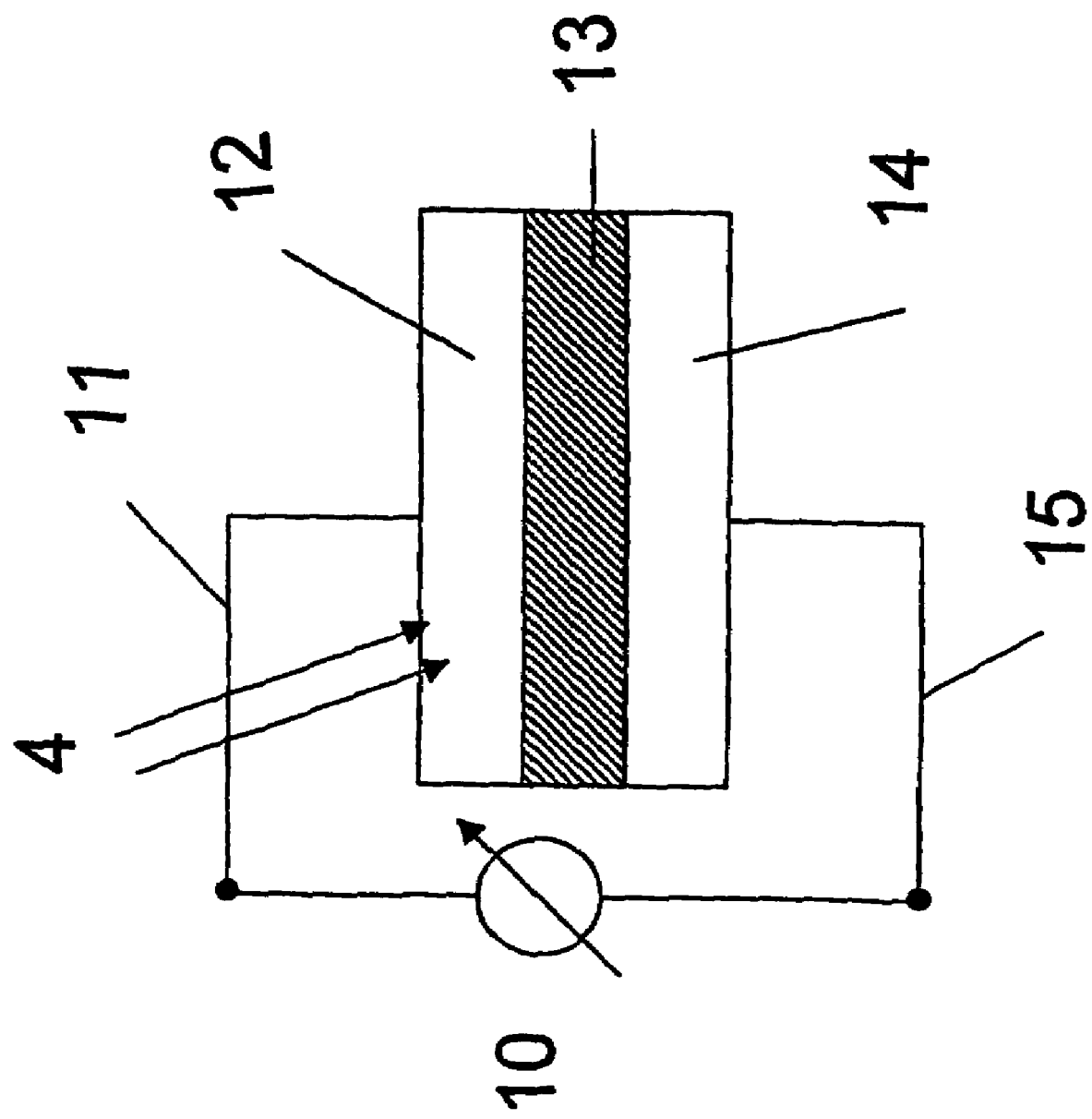
FIG. 3 is a schematic diagram of a structure of a receiver element for receiving at least one environmental influence.

FIG. 3 shows the simplest schematic structure of a receiver element 2 which can receive an environmental influence, e.g. light. Here can be seen the device 10 for measuring the photovoltage or the photocurrent, which is connected via a first feed line 11 to a first organic conductor material 12. The light 4 strikes this first organic conductor material 12 and generates current or voltage, e.g. by charge separation in the material. This current travels through the organic semiconducting material 13 and flows to the second conductor material 14, which is connected in turn via the second feed line 15 to the device 10 for measuring the photovoltage or the photocurrent.

Figure 4:
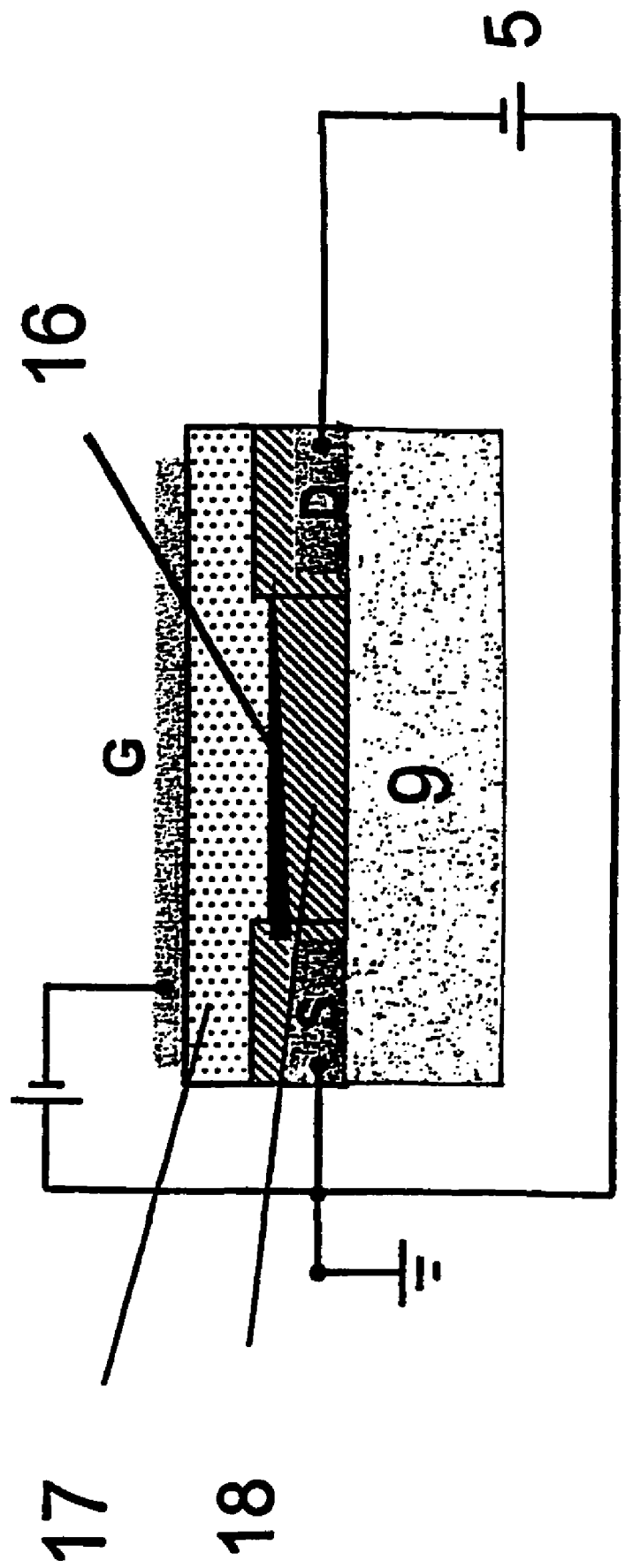
FIG. 4 is a schematic layout of a simple organic field-effect transistor, such as can be used as evaluation electronics.

FIG. 4 shows a schematic layout of a simple organic field effect transistor, such as can be used as evaluation electronics. Mounted at a distance from each other on a substrate 9 are two electrodes, the source S and the drain electrode D, which are connected through a layer to semiconducting organic material 18. The drain electrode C is connected to the supply voltage 5 and the source electrode S is connected to the ground 6. The upper gate electrode G is connected to the feed line of the receiver element 2. As soon as current flows via the receiver element 2 to the gate electrode C, a conducting channel 16 is generated in the semiconducting layer 18 between the source and the drain electrode owing to the resulting field effect which acts through the insulator layer 17.

Figure 5:
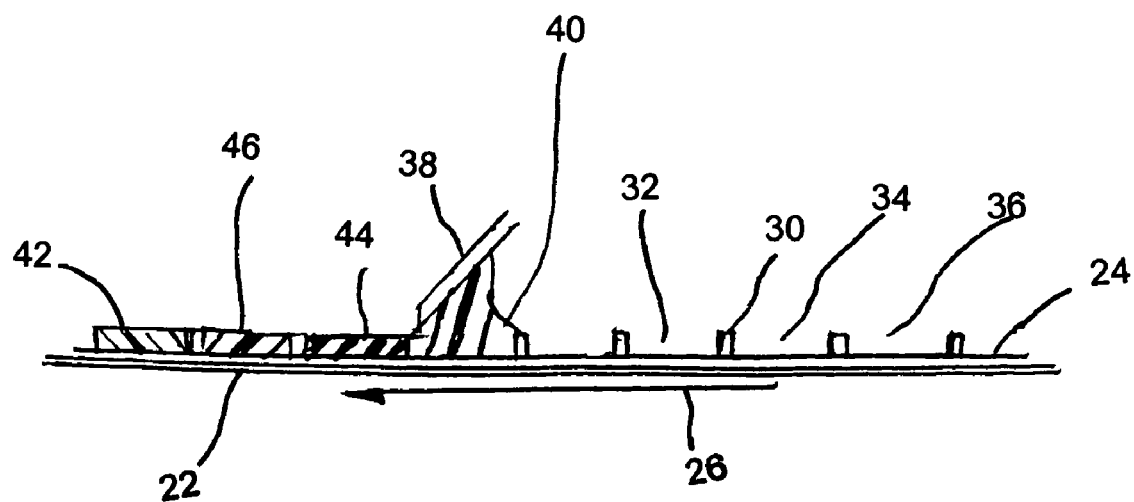
FIG. 5 is an elevation diagrammatic view of a continuous coating process according to an embodiment of the present invention.

FIG. 5 illustrates a continuous process which includes a conveyor belt 22 which is displaced in direction 28 by a drive mechanism (not shown). A film substrate 24 is on and conveyed by belt 22. The substrate carries a recessed mold layer 30 in which circuit recesses 32, 34 and 36 were previously formed in the mold layer by known techniques. A doctor blade 38 applies a coating 40 of organic material into the recesses 32, 34 and 36 in a continuous process to form a receiver circuit 42, an evaluation circuit 44 and connections 46. A continuous process using a doctor blade, by way of example, is disclosed for structuring an OFET in commonly owned U.S. Pat. No. 6,960,489 which matured from an application cited in applicants' disclosure statement filed Sep. 30, 2004 and published as a PCT application WO 02/19443 on Mar. 7, 2002.

Figure 6:
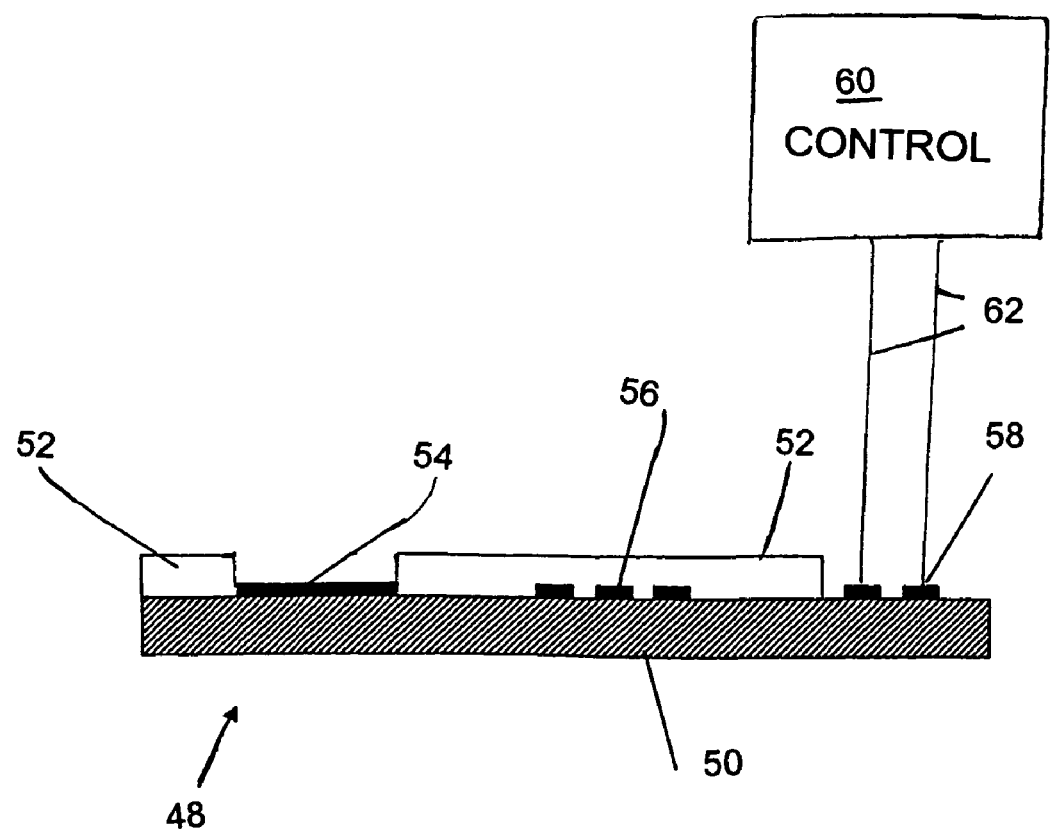
FIG. 6 is a schematic diagram of a further embodiment of the present invention.

FIG. 6 shows a cross-section through a device 48, which is somewhat similar to the device 1 of FIG. 2, but is for detecting at least one environmental influence such as the concentration of material in the environment. Encapsulation 52 on the substrate 50, which may be flexible. e.g.. a film, is applied to expose the receiver element 54 to the surrounding atmosphere for detecting the material in the environment, which in this case is a gas composition to be analyzed. Also, the organic evaluation electronics 56 is covered by the encapsulation 52. Connecting contacts 58 are external the encapsulation 52. A closed loon circuit and control 60 is coupled to the contacts 58 by conductors 62.

The invention claimed is:

1. A device for detecting at least one received environmental influence comprising:
    at least one active receiver element substantially composed of organic material and which receives the at least one received environmental influence, the receiver element being responsive to the incidence of the environmental influence thereon to generate a first output electrical signal manifesting the value of the at least one environmental influence incident upon the receiver element and which element converts the at least one received environmental influence into the generated first electrical output signal;
    at least one evaluation circuit which processes and transmits the electrical signal applied thereto as a second output signal therefrom, said evaluation circuit comprising at least one organic field effect transistor, said second output electrical signal manifesting the received environmental influence; and
    an encapsulation media that is transmissive of the received environmental influence for encapsulating the at least one receiver element with the encapsulation media through which encapsulation media the received environmental influence passes for reception by the at least one receiver element.

2. The device according to claim 1 further including an arrangement including a plurality of said device which are arranged to receive and process multiple environmental influences into corresponding ones of said signal and transmit the respective corresponding electrical signals therefrom in parallel and/or sequentially.

3. The device according to claim 1, wherein the evaluation circuit includes at least one element comprising the field effect transistor, the organic material being identical in the at least one receiver element and in the at least one element of the evaluation circuit.

4. Method for producing an electronic organic device for detecting at least one environmental influence comprising:
    coating at least one substrate with organic material thereby forming on the at least one substrate:
        a. at least one active receiver element substantially composed of organic material for receiving and detecting at least one environmental influence and for converting the at least one received and detected influence into a first electrical output signal by generating the first output signal in response to the receipt of the detected influenced;
        b. an evaluation circuit responsive to the electrical signal for producing an evaluation signal, the evaluation circuit comprising at least one organic field effect transistor; and
        c. an associated connection arrangement for interconnecting the evaluation circuit with the at least one receiver element; and then
    encapsulating at least the at least one receiver element with an encapsulation media permeable to the detected at least one environmental influence.

5. Method according to claim 4, including the step of applying the coating at least partially by printing and/or introducing the coating material by a doctor blade.

6. Method according to claim 4, including the step of applying the coating in a continuous process.

7. A device for detecting at least one received environmental influence excluding light, comprising:
    at least one active receiver element which is substantially composed of organic material, the receiver element for outputting an electrical signal in response to the receipt of the environmental influence, the receiver element for generating the outputted electrical signal by converting the at least one received environmental influence into said generated electrical output signal;
    at least one evaluation circuit which processes and transmits the electrical signal applied thereto and comprising an organic field effect transistor; and an encapsulation media for encapsulating the at least one receiver element, the encapsulation media being permeable to the received environmental influence for transmitting that received environmental influence therethrough.

8. The device of claim 7 wherein both the receiver element and the evaluation circuit are encapsulated with the encapsulation media.

9. A sensor device for detecting at least one received environmental influence comprising:
- at least one active receiver element for receiving the at least one environmental influence, the receiver element being substantially composed of organic material and for generating a first electrical output signal in response to the receipt of said at least one environmental influence by converting the received at least one environmental influence into the generated first output signal whose value manifests the received at least one received environmental influence;
- at least one evaluation circuit comprising an organic field effect transistor which processes and transmits the first output electrical signal applied as an input thereto;
- an encapsulation media for encapsulating the at least one receiver element and for transmitting the received at least one environmental influence therethrough to the at least one receiver; and
- the at least one evaluation circuit comprising an arrangement associated with the at least one receiver element and responsive to the first output signal applied thereto as an input for producing a second output electrical signal.

10. A device forming a security element for detecting at least one received environmental influence comprising:
- at least one receiver element that is substantially composed of organic material and which converts the received environmental influence comprising the concentration and/or the aggregate status of a material in the environment into an electrical signal;
- at least one evaluation circuit which processes and transmits the electrical signal applied thereto;
- an encapsulation media for encapsulating the at least one receiver element;
- the at least one receiver element being arranged to analyze at least the concentration and/or the aggregate status of a material in the environment and converts this analysis into the electrical signal; and
- a closed-loop and control system for controlling the device.

* * * * *